United States Patent [19]
Boudreau et al.

[11] Patent Number: 5,500,910
[45] Date of Patent: Mar. 19, 1996

[54] PASSIVELY ALIGNED HOLOGRAPHIC WDM

[75] Inventors: Robert A. Boudreau, Hummelstown; Terry P. Bowen, Etters; Hongtao Han, Mechanicsburg; John R. Rowlette, Sr., Hummelstown, all of Pa.; Jared D. Stack, Charlotte, N.C.

[73] Assignee: The Whitaker Corporation, Wilmington, Del.

[21] Appl. No.: 269,304

[22] Filed: Jun. 30, 1994

[51] Int. Cl.⁶ ..................................... G02B 6/28
[52] U.S. Cl. ................ 385/24; 385/14; 385/10; 385/22
[58] Field of Search ................ 385/14, 24, 10, 385/11, 31, 18, 22, 39

[56] References Cited

U.S. PATENT DOCUMENTS

| | | | |
|---|---|---|---|
| 4,210,923 | 7/1980 | North et al. | 357/30 |
| 4,387,955 | 6/1983 | Ludman et al. | 350/96.19 |
| 4,466,696 | 8/1984 | Carney | 350/96.20 |
| 4,562,632 | 1/1986 | Parchet et al. | 29/281.1 |
| 4,671,603 | 6/1987 | McQuoid et al. | 350/3.7 |
| 4,723,829 | 2/1988 | Koonen | 350/96.19 |
| 4,739,501 | 4/1988 | Fussganger | 370/3 |
| 4,740,951 | 4/1988 | Lizet et al. | 370/3 |
| 4,760,569 | 7/1988 | Mahlein | 370/3 |
| 4,779,946 | 10/1988 | Pimpinella et al. | 350/96.20 |
| 4,800,557 | 1/1989 | Weber | 370/3 |
| 4,871,224 | 10/1989 | Karstensen et al. | 385/14 |
| 4,897,711 | 1/1990 | Blonder et al. | 357/74 |
| 4,923,271 | 5/1990 | Henry et al. | 350/96.19 |
| 4,939,793 | 7/1990 | Stewart | 455/605 |
| 4,946,253 | 8/1990 | Kostuck | 350/169 |
| 5,016,966 | 5/1991 | Bowen et al. | 350/96.19 |
| 5,048,909 | 9/1991 | Henry et al. | 385/27 |
| 5,061,027 | 10/1991 | Richard | 385/14 |
| 5,061,032 | 10/1991 | Meltz et al. | 385/37 |
| 5,073,003 | 12/1991 | Clark | 385/33 |
| 5,077,878 | 1/1992 | Armiento et al. | 29/25.02 |
| 5,101,460 | 3/1992 | Richard | 385/37 |
| 5,107,359 | 4/1992 | Ohuchida | 359/124 |
| 5,123,073 | 6/1992 | Pimpinella | 385/59 |
| 5,163,108 | 11/1992 | Armiento et al. | 385/89 |
| 5,170,269 | 12/1992 | Lin et al. | 359/9 |
| 5,173,959 | 12/1992 | Cambriello | 385/89 |
| 5,182,782 | 1/1993 | Tabasky et al. | 385/89 |
| 5,202,775 | 4/1993 | Feldman et al. | 359/11 |
| 5,224,782 | 7/1993 | Miwa et al. | 384/100 |
| 5,237,434 | 8/1993 | Feldman et al. | 359/19 |
| 5,257,332 | 10/1993 | Pimpinella | 385/59 |

OTHER PUBLICATIONS

"Gigabit Transmitter Array Modules on Silicon Waferboard", Armiento et al., *IEEE Transactions on Components, Hybirds and Manufacturing Technology*, vol. 15, No. 6—Dec. 1992.

"In Situ Monitoring and Universal Modelling of Sacrificial PSG Etching Using Hydrofluoric Acid"—Jianqiang Liu, et al., *IEEE Proceedings on Micro Electro Mechanical Systems*, Feb. 1992.

*Primary Examiner*—John D. Lee
*Assistant Examiner*—Phan T. H. Palmer
*Attorney, Agent, or Firm*—William S. Francos

[57] ABSTRACT

A passively aligned optical interconnect is described for use as a wavelength division multiplexer (WDM) and demultiplexer. The device makes use of silicon waferboard for a low cost interconnect. Computer generated holograms are used to effect the multiplexing/demultiplexing as well as focusing of the beams. In an alternative embodiment, the device is used as a beam splitter for monochromatic light. In yet another embodiment, the device is used to spatially separate the polarization states of light.

40 Claims, 4 Drawing Sheets

PASSIVELY ALIGNED HOLOGRAPHIC WDM

FIELD OF THE INVENTION

The invention relates to the use of silicon waferboard technology to effect the fabrication of a low cost wavelength division multiplexer/demultiplexer in the optical spectrum by using the refractive properties of precision holograms to effect the multiplexing/demultiplexing.

BACKGROUND OF THE INVENTION

Optical frequencies afford much greater communication data rates. The emergence of fiber optic waveguides and optoelectronics has enabled the optical communications industry to make great advances, however at a generally higher cost than that of well-established radio and microwave frequency communication systems. The interface between the electronics and the fiber waveguide is one area in which precision is required, but manufacturers in the optical communications industry are constantly seeking to effect highly precise interconnects at a low cost of manufacture. The emergence of silicon waferboard technology enables great precision in aligning the fiber to the device. This technology is emerging in the industry as a vehicle for low cost-high precision optical interconnects. One method of effecting accurate passive alignment between a device and a fiber or a fiber and a fiber, is the use of V-shaped grooves which are etched into the silicon substrate. The v-grooves are the crystalline planes of silicon revealed by etching the silicon by known techniques. As is disclosed, for example, in U.S. Pat. Nos. 5,224,782; 5,163,108; 5,077,878 and 5,182,782, incorporated herein by reference, by etching along preferred crystalline planes in a silicon waferboard, v-shaped grooves are formed for the accurate passive alignment between fibers or between fibers and devices. For example, as disclosed in U.S. Pat. No. 4,210,923 to North, et al., an $SiO_2$ mask is applied on a silicon substrate having a major surface in the (110) crystalline orientation. By application of a solution of KOH and water, anisotropic etching is effected and v-grooves are formed having sidewalls in the (111) family of crystalline planes. As is further disclosed in North, et al., the precise dimensions of the etched grooves are controlled by picking the width of the etch. Thereby, due to known characteristic relative angles of the crystalline planes, the accurate passive alignment of a fiber to a device is achieved. To be sure, the use of the characteristic planes of a crystalline material can be used to effect a variety of apertures, grooves and the like in crystalline materials thereby allowing a great deal of methods to achieve accurately aligned optical interconnection. Other examples of masking and etching monocrystalline materials to reveal, at desired locations, grooves and or apertures with side walls in preferred crystalline directions are disclosed in U.S. Pat. Nos. 4,897,711; 4,779,946 and 4,446,696, incorporated herein by reference. Another example of the use of silicon waferboard technology to effect interconnection between a fiber waveguide and an optoelectronic device is disclosed in U.S. Pat. No. 4,897,711 to Blonder, et al., incorporated herein by reference. V-shaped grooves defined by crystallographic planes are etched in silicon by processes well known in the art, and optical fibers are placed in a position to receive an optical signal from an optoelectronic device. Blonder, et al. discloses the deposition of a reflective coating on a crystallographic plane revealed by etching the silicon, as well etching a hole in a section of silicon to secure and align a ball lens for focusing light reflected off the reflective coating into a fiber mounted in a v-groove. The reflective coating enables the optical signal to impinge on the fiber within its acceptance angle. The planes revealed in the etching process are characteristic of silicon, and accordingly, are of well known orientation. The '711 reference discloses the use of the precision of the orientation of the crystalline planes to effect the accurate passive alignment of the device to the fiber via the reflective surface.

As stated, one of the great advantages of using silicon waferboard technology as an optical interconnect is the ability to accurately align optical transmission media at interconnection points. One way that this has been achieved is by the use of precision microspheres as is disclosed in U.S. Pat. No. 5 123,073, incorporated herein by reference is an example of the use of the alignment spheres. The basic principle disclosed is the etching of the silicon waferboard to reveal inverted pyramidal shaped recesses which receive the spheres in one half of the silicon waveguide coupler. The recesses are placed precisely on the substrate of silicon, and are sized so that roughly one-half of the sphere protrudes above the surface of the substrate. The second half of the coupler is also a silicon substrate with precisely defined inverse pyramidal shaped recesses which are aligned with the recesses of the first half of the coupler. The recesses in the second half of the coupler receive the protruding portion of the complimentary spheres of the first coupler and thereby enable an accurate passive alignment between two halves of an optical coupler.

The advent of the use of optical frequencies as means of communications has lead to a great deal of interest in the past few decades to new ways of developing optical transceivers and means to effect optical interconnects. One of the areas of great interest has been to effect multiplexing and demultiplexing at optical frequencies in fiber optic waveguides. While optoelectronic devices have been developed to effect multiplexing (mux) and demultiplexing (demux), less complex means have been developed to effect these desired results. For example, U.S. Pat. No. 5,107,359 to Ohuchida, incorporated herein by reference, discloses the use of holographic lenses which in combination with a second hologram that acts as a reflective surface or holographic lens and a reflective surface effects demux by making use of the frequency dependance of a spatial diffraction grating to separate two or more signals of differing wavelengths from a single fiber and to reintroduce the separated signals into separate fibers. Multiplexing is obviously the implementation of the same components with signal direction reversed, whereby two signals of differing frequencies from two fibers are combined to travel in the same fiber.

The interconnection of optical signals often requires a manipulation of the light beam to effect a desired result. Be it interfacing the signal from a fiber to a detector, or changing the direction of propagation of light to effect coupling of light to one or more waveguide(s), silicon waferboard technology enables accurate passive alignment to enable coupling of active and/or passive devices to fibers. It is desirable to be able to effect a simple, low cost mux/demux of the optical signal as well as to effect coupling of the optical signals between fibers in a simple low cost apparatus that is integral with the multiplexer/demultiplexer. Finally, highly accurate passive alignment of the optical fibers is essential to the coupling and mux/demux.

SUMMARY OF THE INVENTION

This and other objects of the invention are achieved in accordance with this invention. A fiber optic multiplexer/ demultiplexer is fabricated in silicon or other suitable monocrystalline material. To this end, by photolithographic and anisotropic etching, v-shaped grooves are fabricated for receiving fiber optic waveguides, and highly accurate fiber-fiber passive alignment is achieved. The etching by the use of photolithography also allows the accurate deposition of a reflective surface at just the right orientation to effect the coupling of light from a fiber to be incident upon a multiplexing (or demultiplexing) hologram, as well as to then be within the acceptance angle of the receiving fiber. Furthermore, photolithography allows for the two halves of the silicon interconnect to be aligned by the use of alignment microspheres. It is yet another object of this invention to effect the fabrication of holograms directly onto the silicon interconnect, thereby enabling the mux/demux without the use of discrete elements that require positioning and placement on the-optical interconnect. Finally, it is an object of this invention to fabricate the holograms on a separate wafer in a very dense configuration, then attach the needed holograms on the lid. This maximizes the use of the silicon wafer real estate.

DETAILED DESCRIPTION OF THE PREFERRED EMBODIMENTS

For purposes of illustration, emphasis will be made herein on particular multiplexer/demultiplexer (mux/demux) made of silicon. The major advantages of using the defined crystalline planes etched to provide proper alignment and positioning of the different components of the optical device as well as the fabrication of holograms directly onto the substrate of the device is the focus of the invention. As the use of the crystalline planes for accurate positioning and alignment of the optical components is the inventive feature, it is clear that any appropriate crystalline material within the purview of the skilled artisan is intended by this application. Specifically, it is to be understood that the reference to the use of silicon is intended to be illustrative and in no way intended to be limiting.

Figure 1:
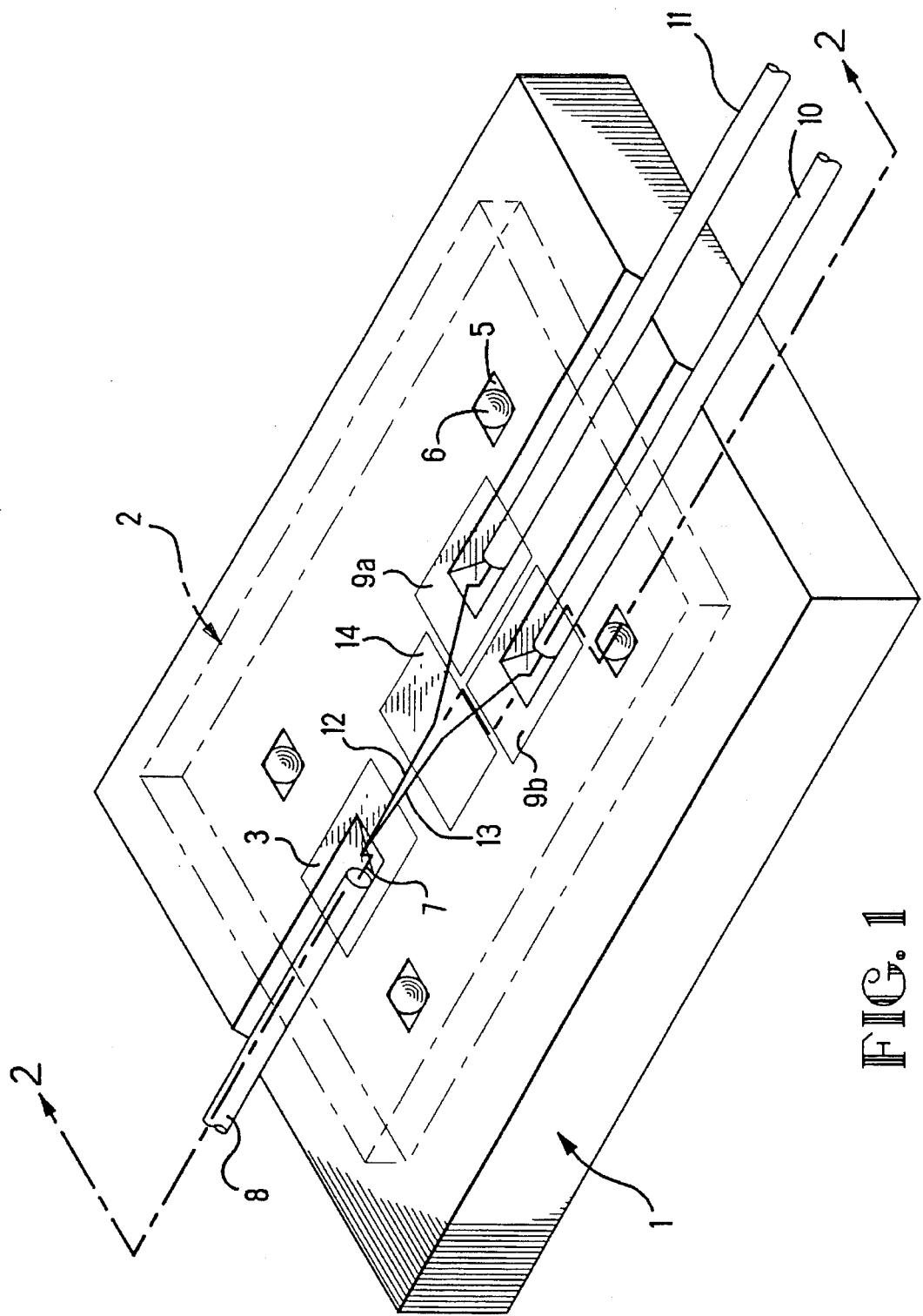
FIG. 1 shows a perspective view of the bidirectional link.

Referring now to FIG. 1, we see a perspective view of the mux/demux. Silicon substrate 1 provides a base, and a silicon lid 2 encloses the device, as well as provides the material for fabrication of the holographic optical elements 3, 9a and 9b (HOE's), reflective surfaces 15, a reflector 14 and the receiving cavities 5 for the alignment spheres 6. While there are four alignment spheres shown, it is clear that three would define a plane of alignment, and three would suffice to effect alignment. It is to be understood that the use of four spheres is intended to be merely instructional and in no way limiting, as more or less could be used in this and other configurations.

The multiplexing/demultiplexing operation is best understood from reference to FIG. 1. Optical fiber waveguide 8 is a single mode or a multimode fiber carrying at least two signals of differing frequencies (As is understood by the skilled artisan, the frequency of an optical signal is independent of the optical medium, whereas its wavelength is medium dependant). As can be appreciated from the fundamental theory of multiplexing, the carrying of multiple carrier frequencies (and thereby wavelengths) in a single medium allows the transmission of information frequencies which are very close in magnitude without harmful interference. Thereby, it is possible to carry twice as many (or more as is practical) signals down a single fiber. As a practical matter, the various carrier must be chosen sufficiently apart in frequency, so that the spectra of the modulated signals will not overlap and thus will not interfere with one another. The two (or more) signals must be separated and routed to their appropriate destination to effect the communication. While multiplexing/demultiplexing can be a complicated process at rf and other frequencies, the process is generally one of directional coupling in guided wave communications, to include, of course, optical frequencies. In this particular invention, the use of holograms 3 to effect spatial diffraction is utilized. As is well known in the optical arts, holograms are in essence very fine diffraction gratings, which can be used to effect a broad variety of desired results. In this particular application, the input optical signal 7, is, as described, of multiple frequencies. It is reflected onto the HOE 3, where it is diffracted. Because of the frequency dependance of diffraction, the differing frequencies of the multiplexed input signal are diffracted to a differing extent. This diffraction enables their physical separation. The separated light signals 12 and 13 are then transmitted in the optically transparent silicon lid 2, and are incident on a reflector 14 which is deposited on the upper surface of the lid 2. It is important to note that silicon is but one appropriate material from which to make the lid. For example, quartz, silica and other optical materials that would be obvious to the skilled artisan are considered within the purview of the invention. The optical signals 12 and 13 are then impingent on holograms 9a and 9b, respectively. These holograms then focus the respective signals onto reflective surfaces 15 deposited on etched surfaces, which are etched into the substrate. These reflective surfaces enable the optical signals 12 and 13 to be within the acceptance angle of the fibers 10 and 11. These fibers 10 and 11 carry the demultiplexed (separated) frequency signals to desired destinations. The simplest example is demultiplexing where there are as many output fibers as there are input wavelengths, thereby fully demultiplexing the incoming signal. It is certainly within the scope of the invention that there are either more or less input wavelengths in the input fiber as there are output fibers to carry out the demultiplexed signal. It the case where there are more wavelengths to be separated than there are output fibers, all wavelengths will be separated, but some will not be coupled to output fibers. It is clear that the reverse operation, having fibers 10 and 11 act as input fibers, would result in a multiplexed signal transmitted in fiber 8, which would then be the output fiber. It is important to recognize that while the input and output fibers and their respective grooves are shown on opposite sides of the substrate, it is certainly within the scope of the invention to have them situated on the same side or on adjacent sides. This would be a straight forward adaptation of the components of the basic invention.

As mentioned above, the holograms 3, 9a and 9b are formed directly onto the silicon by a process described presently. The holograms are disposed on the silicon lid 2 by a process known as Radially Symmetric Iterative Discrete On-Axis (RSIDO) encoding method. This technique boasts diffraction efficiencies of 85%–95% as opposed to previous encoding schemes which achieve only 60% diffraction efficiency. Holograms which achieve such diffraction efficiencies are capable of highly accurate focusing. In this case, this method allows for wavelength dependant diffraction to effect the mux/demux as well as for focusing the optical signal. This technique is based on the Rayleigh-Sommerfeld diffraction equation for modeling a single ring. By iteratively generating a series of concentric rings based on the Rayleigh-Sommerfeld theory, the holograms are formed. This technique is particularly adaptable for photolitographic masking and etching techniques. For a more complete description of RSIDO, see U.S. Pat. No. 5,202,775 to Feldman, et al., incorporated herein by reference. In the present invention, the lid 2 is made of silicon of a particular preferred crystalline direction. To fabricate the holograms 3, 9a and 9b, an amorphous layer of $SiO_2$ or polysilicon is deposited by chemical vapor deposition (CVD) or other techniques known in the art. Thereby a surface is created which does not anisotropically etch. Thereafter, a photoresist is spin coated onto a chrome-on-quartz substrate. The pattern of the photoresist is determined from the output of an encoding scheme such as RSIDO which gives a high diffraction efficiency. The pattern is selectively etched in the chrome film to form a mask. These steps are repeated to form three masks which can be used to create eight phase levels. Next a photoresist is spin coated on the amorphous silica layer, and UV radiation is used to illuminate the mask. The mask is imaged onto the resist to expose, for example a 5× reduction. The resist is then developed to create the pattern in the amorphous layer. The amorphous layer is then reactive ion etched to create the appropriate phase depths. The process is then repeated with other masks for additional phase steps. It is important to recognize that the direct fabrication of the holograms on the lid is but one method to dispose the holograms in the present invention. Another technique for disposition of the holograms is to attach pre-fabricated holograms to the lower surface of the lid. One such technique is that which is referred to as "lift off" technology, in which holograms are fabricated on a substrate, and then removed for placement elsewhere. There are many approaches to lift off technology. One approach is to provide a sacrificial layer of PSG (phosphosilicate glass) on a silicon substrate and then to deposit a layer of polysilicon on which is fabricate the holograms. A pattern of access holes is provided around each of the holograms. An etch resist is provided over the hologram and HF (hydrofluoric acid) is used to attack the PSG and lift off the holograms. For further details of this lift off technique, refer to "In Situ Monitoring and Universal Modeling of Sacrificial PSG Etching Using Hydrofluoric Acid", by Jainqiang Liu, et al. IEEE Proceedings On Micro Electro Mechanical Systems, February 1992, incorporated herein by reference. This technique allows the holograms to be removed from the wafer with photolithographic precision. Finally, it is important to note that these are but two examples of disposing the HOE's onto the lid. These are intended to be informative and in no way limiting.

Figure 2:
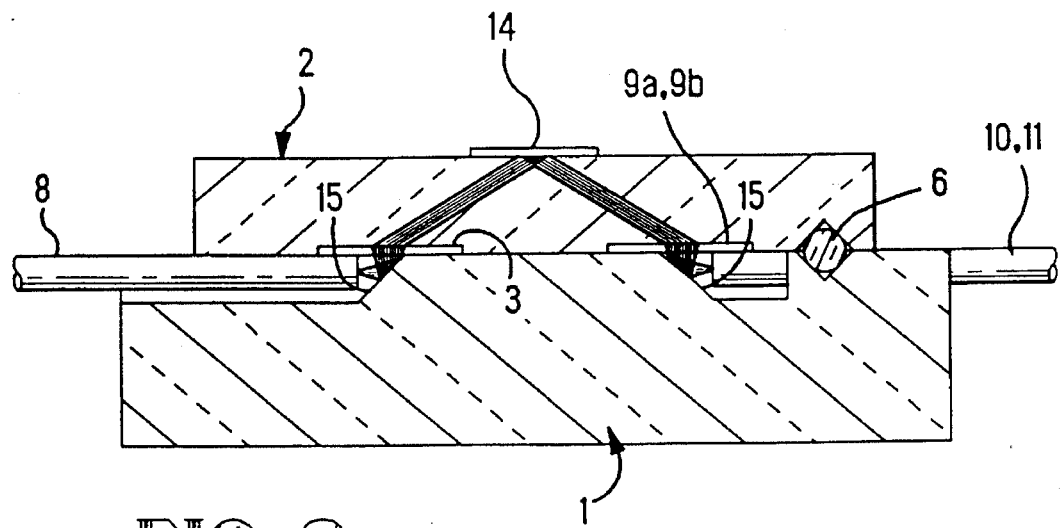
FIG. 2 is a side view of the bidirectional link showing the light path from side perspective.
Figure 3:
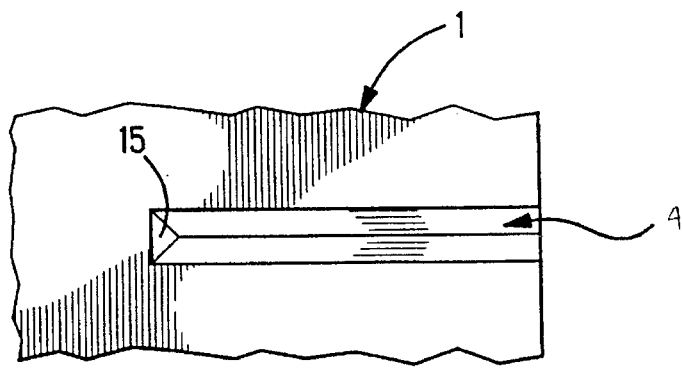
FIG. 3 shows the top view of the etched groove with surface at the inward end which provides the base for the reflective surface.
Figure 4:
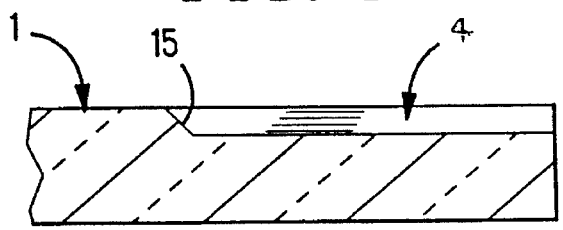
FIG. 4 shows a side view of an etched v-groove.
Figure 5:
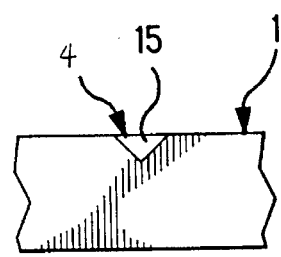
FIG. 5 shows a front view of a etched v-groove.

Turning now to FIG. 2, we see a side perspective view of the mux/demux. As can be seen, the fibers 8, 10 and 11 are held in v-shaped grooves 4 which are etched into the substrate 1, by techniques well know to the skilled artisan. The critical feature is that the substrate be of a monocrystalline material, and the etching will reveal the crystalline planes to form v-shaped grooves. As is described in the '923 patent to North et al., as described above, the depth and the width of the v-groove is controlled with great precision. This enables a highly accurate passive alignment of the fibers by photolitographic masking and etching, a relatively low-cost process. The surfaces 15 are crystalline planes revealed by etching the substrate 1. These surfaces are then coated with a good reflecting material such as gold. The reflective surfaces 15 act to launch the optical signal to the multiplexer/demultiplexer, and to make the optical signal incident upon the fiber waveguide. Finally, as is seen in FIGS. 1 and 2, the passive alignment spheres 6, rest in inverted pyramid shaped cavities 5 which are etched by techniques similar to those previously mentioned. By etching to reveal the crystalline planes to form these cavities, a very accurate passive alignment technique is achieved at a low cost. The spheres are highly precise and low in cost, thereby enabling the coupling of the lid and substrate with great precision. This affords a readily aligned, low cost mux/demux.

Figure 6:
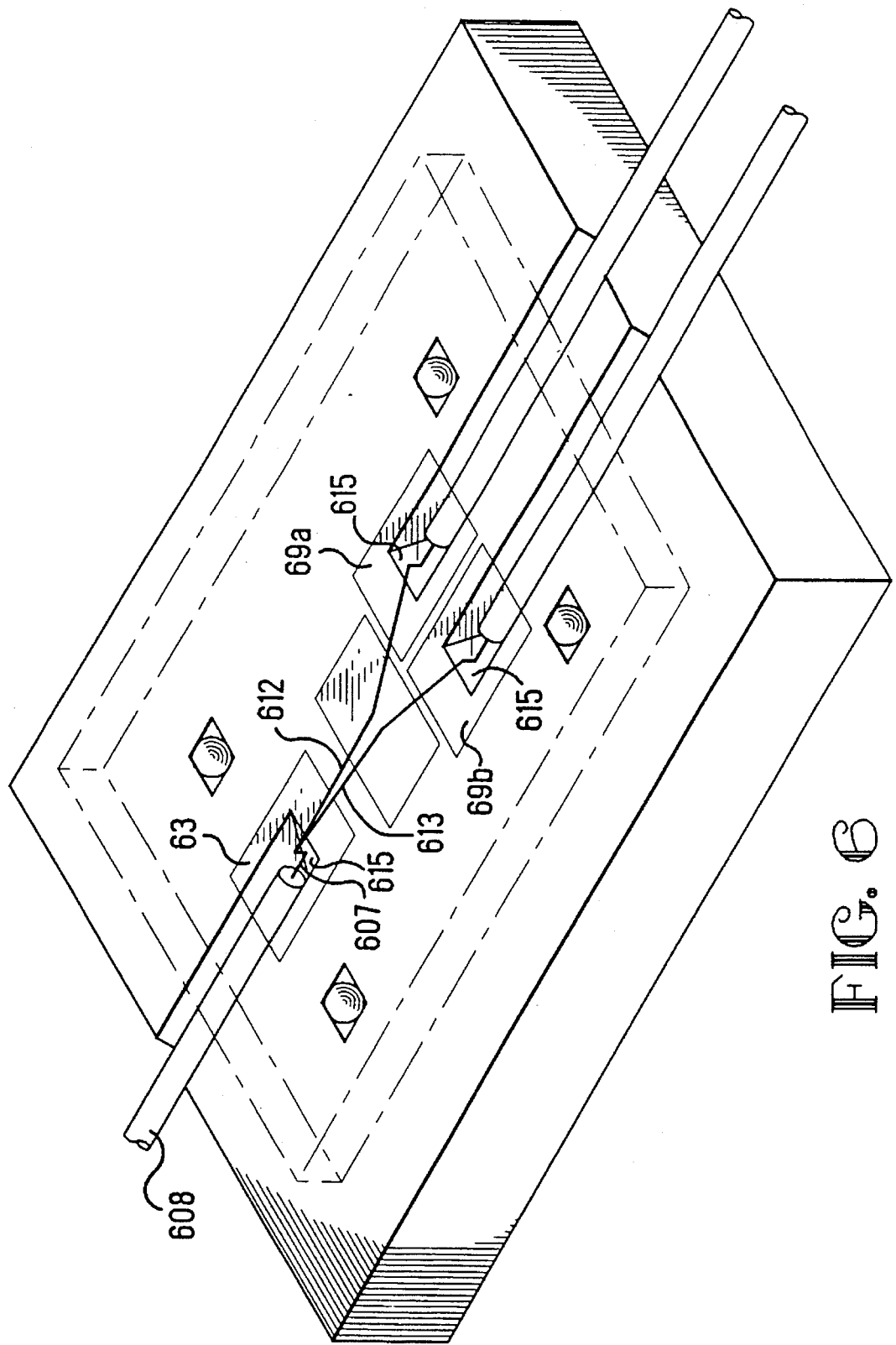
FIG. 6 shows a 1×2 beam splitter.
Figure 7:
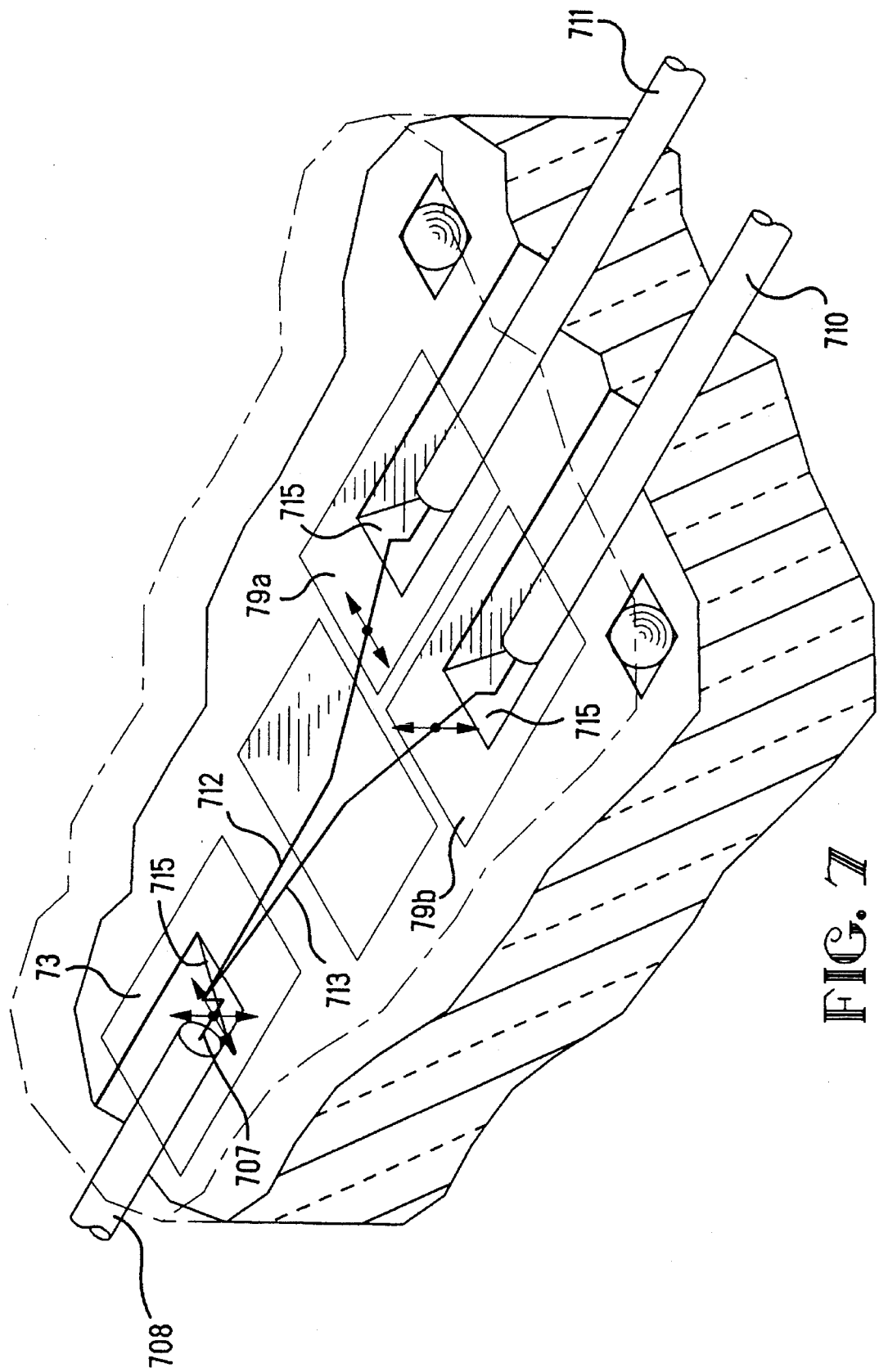
FIG. 7 shows a polarization splitter.

While the primary focus of the application of silicon waferboard technology in the above description has been the multiplexing/demultiplexing, there are two other applications of the technology which are well within the purview of the skilled artisan. The first, shown in FIG. 6, is the use of the apparatus as a 1×N beam splitter. It is well known to one of ordinary skill in the art to use holograms to split the incident power of a substantially monochromatic incident beam into N beams. In the present application, the HOE 63 performs the beam splitting function by splitting the incident beam 607 into beams 612 and 613. The HOE's 69a and 69b perform the focusing function (Clearly, this is an example of a 1×2 splitter, and a simple expansion would enable a 1×N splitter). The second example, shown in FIG. 7, is the use of the apparatus to split light of various polarization components, and then direct the separated components into individual output fibers 710 and 711. The hologram 73 as shown in FIG. 1 would be fabricated to spatially separate the orthogonal components of polarization 712 and 713 of the incoming beam 707 in much the same way as does a dichroic crystal. This application of HOE's has been described in further detail in U.S. Pat. No. 4,946,253, to Kostuck, incorporated herein by reference. In the present application, the spatially separated beams will be impingent on the focusing HOE's 79a and 79b to couple the beams to individual fibers 710 and 711.

As can be appreciated from the above description, a major advantage of the invention is the accuracy that the photolithographic masking and etching provides in the alignment and fabrication of the optical components of the multiplexer. To be specific, the v-grooves and cavities for the alignment spheres precisely define the needed alignment of the fibers, HOE's and reflective surfaces to allow the multiplexing/demultiplexing to be achieved. The reflective surfaces 15,615,715 are a further application of the use of photolithography to use the crystalline planes of a monocrystalline material to effect precisely placed reflective surfaces to enable the coupling of the light to and from the fiber waveguides. Finally, the fabrication of the HOE's on silicon is a direct result of the use of the etching techniques as mentioned above. It is important to recognize that these etching techniques are well known to the skilled artisan, and come at a relatively low cost.

Various additional modifications will become apparent to those of ordinary skill in the art. All such variations which basically rely on the teachings which this invention advances in the art are considered within the scope of the invention.

We claim:

1. A bidirectional optical interconnect, comprising:
   (a.) A substrate having a selected thickness between top and bottom surfaces;
   (b.) A lid having a selected thickness between top and bottom surfaces, said bottom surface of said lid mounted on said top surface of said substrate;
   (c.) A groove etched into said top surface of said substrate on a first end of said substrate, and at least two substantially parallel grooves etched into a second end of said top surface of said substrate, said grooves having optical waveguides disposed therein;
   (d.) Reflective surfaces disposed at an end of each of said grooves for reflecting light to and from said waveguides;
   (e.) At least one optical element disposed on said bottom surface of said lid and substantially above each of said reflective surfaces; and
   (f.) A reflector disposed on said top surface of said lid for reflecting light to and from selected optical elements, whereby light transmitted through said waveguide disposed in said groove in said first end is reflected off one of said reflective surfaces to one of said optical elements, is transmitted through said lid, is reflected off said reflector to one of said optical elements, is transmitted to one of said reflective surfaces and is reflected into at least one of said waveguides on said second end of said substrate.

2. A bidirectional optical interconnect as recited in claim 1, wherein said waveguide on said first end of said substrate transmits light of as many different wavelengths as there are waveguides at said second end of said substrate.

3. A bidirectional optical interconnect as recited in claim 2, wherein said optical element disposed substantially above said reflective surface at an end of said waveguide at said first end of said substrate is a diffractive optical element which spatially separates each of said different wavelengths.

4. A bidirectional optical interconnect as recited in claim 3, wherein each of said spatially separated wavelengths is transmitted through said lid, reflected off said reflector to one of said optical elements disposed above one of said reflective surfaces disposed at an end of each of said grooves at said second end of said substrate and is reflected into one of said waveguides disposed at said second end of said substrate.

5. A bidirectional optical interconnect as recited in claim 4, wherein said optical elements are holographic optical element.

6. A bidirectional optical interconnect as recited in claim 1, wherein said substrate is made of silicon.

7. An bidirectional optical interconnect as recited in claim 6, wherein said at least one optical element is a holographic optical element etched into said lid.

8. A bidirectional optical interconnect, comprising:
   (a) A substrate having a selected thickness between top and bottom surfaces, and grooves etched into a first end and a second end of said substrate, said grooves extending from said ends toward a center of said substrate;
   (b) Optical waveguides mounted in said grooves and a reflective surface on an end of each of said grooves, said ends of said grooves being toward said center of said substrate;
   (c) A lid having a selected thickness between top and bottom surfaces, said bottom surface of said lid mounted on said top surface of said substrate; and
   (d) At least one optical element disposed on said lower surface of said lid and a reflector disposed on said top surface of said lid, whereby light emitted from one of said optical waveguides on said first end of said substrate is reflected off one of said reflective surfaces to one of said optical elements, is reflected off said reflector to another of said optical elements and is reflected off another of said reflective surfaces into at least one of said optical waveguides mounted in one of said grooves in said second end of said substrate.

9. An apparatus as recited in claim 8, wherein said at least one optical element is a hologram.

10. An apparatus as recited in claim 9, wherein said hologram is formed integrally on said lid.

11. An apparatus as recited in claim 10 wherein said substrate and said lid are made of a monocrystalline material.

12. An apparatus as recited in claim 11, wherein said monocrystalline material is silicon.

13. An apparatus as recited in claim 11, wherein inherent crystalline planes of said monocrystalline material are revealed through photolithographic etching.

14. An apparatus as recited in claim 9, wherein one waveguide is mounted in said groove in said first end of said substrate and carries as many different wavelengths of light as there are waveguides mounted in said grooves in said second end of said substrate.

15. An apparatus as set forth in claim 14, wherein said holograms spatially separate said light of different wavelengths, thereby achieving demultiplexing of a multiplexed signal.

16. A bidirectional optical interconnect, comprising:
   (a) A substrate having a selected thickness between top and bottom surfaces, and grooves etched into a first end and a second end of said substrate, said grooves extending from said ends toward a center of said substrate;
   (b) Optical waveguides mounted in said grooves and a reflective surface on an end of each of said grooves, said ends of said grooves being toward said center of said substrate;
   (c) A lid having a selected thickness between top and bottom surfaces, said bottom surface of said lid mounted to said top surface; and
   (d) At least one optical element disposed on said lower surface of said lid and a reflector disposed on said top surface of said lid, whereby light traveling in said waveguides in said second end of said substrate is reflected off one of said reflective surfaces to one of said optical elements, is then reflected off said reflector to another of said optical elements is directed to another of said reflective surfaces and is reflected into at least one of said waveguides mounted in said grooves in said first end.

17. An apparatus as recited in claim 16, wherein said at least one optical element is a hologram.

18. An apparatus as recited in claim 17, wherein said hologram is formed integrally on said lid.

19. An apparatus as recited in claim 18 wherein said substrate and said lid are made of a monocrystalline material.

20. An apparatus as recited in claim 19, wherein said monocrystalline material is silicon.

21. An apparatus as recited in claim 19, wherein inherent crystalline planes of said monocrystalline material are revealed through photolithographic etching.

22. An apparatus as recited in claim 17, wherein one waveguide is mounted in said groove in said first end of said substrate and carries as many different wavelengths of light as there are waveguides mounted in said grooves in said second end of said substrate.

23. An apparatus as recited in claim 22, wherein said holograms spatially focus said light of different wavelengths of said waveguides of said second end into one waveguide on said first end, thereby wavelength division multiplexing.

24. A bidirectional optical interconnect, comprising:
(a.) A substrate having a selected thickness between top and bottom surfaces;
(b.) A lid having a selected thickness between top and bottom surfaces, said bottom surface of said lid mounted on said top surface of said substrate;
(c.) A first groove etched into said top surface of said substrate, and at least two substantially parallel second grooves etched into said top surface of said substrate, said first and second grooves having optical waveguides disposed therein;
(d.) Reflective surfaces disposed at an end of each of said first and second grooves for reflecting light to and from said waveguides;
(e.) At least one optical element disposed on said bottom surface of said lid and substantially above each of said reflective surfaces; and
(f.) A reflector disposed on said top surface of said lid for reflecting light to and from selected optical elements, whereby light transmitted through said waveguide disposed in said first groove, is reflected off one of said reflective surfaces to one of said optical elements, is transmitted through said lid, is reflected off said reflector to at least one of said optical elements, is transmitted to one of said reflective surfaces and is reflected into one of said waveguides disposed in one of said second grooves.

25. An apparatus as recited in claim 24, wherein said at least one optical element is a hologram.

26. An apparatus as recited in claim 25, wherein said hologram is formed integrally on said lid.

27. An apparatus as recited in claim 26, wherein said substrate and said lid are made of a monocrystalline material.

28. An apparatus as recited in claim 27, wherein inherent crystalline planes of said monocrystalline material are revealed through photolithographic etching.

29. An apparatus as recited in claim 28, wherein said waveguide in said first groove carries at least as many different wavelengths of light as there are waveguides disposed in said second grooves.

30. An apparatus as recited in claim 28, wherein said waveguide in said first groove carries at most as many different wavelengths of light as there are waveguides disposed in said second grooves.

31. An apparatus as recited in claim 29 or 30, wherein holograms spatially separate said light of different wavelengths, thereby achieving demultiplexing of a multiplexed signal.

32. A bidirectional optical interconnect as recited in claim 24, wherein light transmitted in said waveguide in said first groove is of at least one polarization state.

33. A bidirectional optical interconnect as recited in claim 32, wherein said at least one of said optical elements is a polarization separating hologram which spatially separates the light of different polarization.

34. A bidirectional optical interconnect, comprising:
(a.) A substrate having a selected thickness between top and bottom surfaces;
(b.) A lid having a selected thickness between top and bottom surfaces, said bottom surface of said lid mounted on said top surface of said substrate;
(c.) A first groove etched into said top surface of said substrate, and at least two substantially parallel second grooves etched into said top surface of said substrate, said first and second grooves having optical waveguides disposed therein;
(d.) Reflective surfaces disposed at an end of each of said first and second grooves for reflecting light to and from said waveguides;
(e.) At least one optical element disposed on said bottom surface of said lid and substantially above each of said reflective surfaces; and
(f.) A reflector disposed on said top surface of said lid for reflecting light to and from selected optical elements, whereby light transmitted through said waveguides disposed in said second grooves, is reflected off of said reflective surfaces to one of said optical elements, is transmitted through said lid, is reflected off said reflector to one of said optical elements, is transmitted to one of said reflective surfaces and is reflected into said waveguide disposed in said first groove.

35. An apparatus as recited in claim 34, wherein said at least one optical element is a hologram.

36. An apparatus as recited in claim 35, wherein said hologram is formed integrally on said lid.

37. An apparatus as recited in claim 36, wherein said substrate and said lid are made of a monocrystalline material.

38. An apparatus as recited in claim 37, wherein inherent crystalline planes of said monocrystalline material are revealed through photolithographic etching.

39. An apparatus as recited in claim 38, wherein said waveguides in said second grooves carry different wavelengths of light.

40. An apparatus as recited in claim 39, wherein light traveling down said waveguides of said second grooves is focused by at least one of said optical elements into said waveguide of said first groove, thereby achieving wavelength division multiplexing.

* * * * *